United States Patent [19]

Fukutomi et al.

[11] Patent Number: 4,989,563
[45] Date of Patent: Feb. 5, 1991

[54] AUXILIARY AIR AMOUNT CONTROL SYSTEM FOR INTERNAL COMBUSTION ENGINES AT DECELERATION

[75] Inventors: Yohji Fukutomi; Youichi Iwata, both of Wako, Japan

[73] Assignee: Honda Giken Kogyo Kabushiki Kaisha, Tokyo, Japan

[21] Appl. No.: 388,572

[22] Filed: Aug. 1, 1989

[30] Foreign Application Priority Data

Aug. 3, 1988 [JP] Japan .................. 63-193627

[51] Int. Cl.$^5$ .............................................. F02D 41/12
[52] U.S. Cl. ................................. 123/327; 123/586; 74/860
[58] Field of Search ............... 123/327, 586, 585; 74/860, 858

[56] References Cited

U.S. PATENT DOCUMENTS

| Re. 32,030 | 11/1985 | Yano et al. | 123/327 |
| 4,513,713 | 4/1985 | Koumura et al. | 123/585 |
| 4,526,144 | 7/1985 | Hasegawa et al. | 123/327 |
| 4,788,954 | 12/1988 | Otobe et al. | 123/327 |

FOREIGN PATENT DOCUMENTS

| 60-178940 | 9/1985 | Japan | 123/327 |
| 61-200367 | 9/1986 | Japan | 123/327 |
| 61-241457 | 10/1986 | Japan | 123/585 |
| 63-18152 | 1/1988 | Japan . | |

Primary Examiner—Andrew M. Dolinar
Attorney, Agent, or Firm—Lyon & Lyon

[57] ABSTRACT

An auxiliary air amount control system for an internal combustion engine has an auxiliary air passage bypassing a throttle valve arranged within the intake pipe of the engine, and a control valve controlling the amount of auxiliary air supplied to the engine through the auxiliary air passage by varying the opening of the passage. The opening of the control valve is set in response to the opening of the throttle valve, and is decreased progressively from the set value as an initial value when the engine is in a predetermined decelerating condition. The set control valve opening is varied to a larger value as the reduction ratio assumed by a transmission connected to the engine is larger. The minimum value of the throttle valve opening at which the control valve opening can be set to a value larger than zero is varied to a smaller value as the reduction ratio is larger. The rate at which the control valve opening is progressively decreased is varied to a smaller value as the reduction ratio is larger.

19 Claims, 5 Drawing Sheets

AUXILIARY AIR AMOUNT CONTROL SYSTEM FOR INTERNAL COMBUSTION ENGINES AT DECELERATION

BACKGROUND OF THE INVENTION

This invention relates to an auxiliary air quantity control system for internal combustion engines at deceleration, and more particularly to a system of this type which is intended to properly controlling an amount of auxiliary air supplied to the engine at deceleration thereof in dependence upon the reduction ratio of a transmission connected to the engine.

A control system for controlling the auxiliary air amount is known e.g. from Japanese Provisional Patent Publication (Kokai) No. 63-18152, in which while the throttle valve is open, the opening of a control valve for opening and closing a bypass passage bypassing a throttle valve of the engine is set to a value corresponding to the opening of the throttle valve, whereas When the throttle valve is closed, the opening of the control valve is gradually decreased from a value assumed immediately before the throttle valve becomes closed, so as to gradually decrease an amount of intake air supplied to the engine, to thereby prevent sudden atomization of fuel adhering to the inner surface of the intake pipe of the engine due to suddenly increased vacuum within the intake pipe by the closure of the throttle valve, and hence prevent overriching of the air-fuel ratio of an air-fuel mixture supplied to the engine.

To be specific, the above conventional control system is constructed such that when the opening of the throttle valve is smaller than a predetermined value, the control valve is kept closed even if the throttle valve is open, whereby the intake air is supplied to the engine only through the throttle valve. This construction is based on the following ground:

When the throttle valve is suddenly closed from a state in which it is slightly open, vacuum within the intake pipe increases at so small a rate that the degree of overriching of the air-fuel ratio of the mixture is very small to make it unnecessary to gradually decrease the intake air or auxiliary air amount after the throttle valve is fully closed. Further, when the throttle valve is closed to decelerate the vehicle while the transmission is in a small reduction ratio position, e.g. in the fourth speed gear position, in order to obtain good decelerability of the engine the control valve should be closed to suddenly decrease the auxiliary air amount to thereby properly decrease engine output before and after the throttle valve is fully closed.

However, the above construction has the disadvantage that when the transmission is in a large reduction ratio position, e.g. in the first speed position, if the auxiliary air amount is suddenly decreased before and after the throttle valve is fully closed, the engine torque suddenly decreases by a large amount to cause engine shock at the start of deceleration.

SUMMARY OF THE INVENTION

It is an object of the invention to provide an auxiliary air amount control system for internal engines which is capable of reducing engine shock during deceleration thereof when the transmission is in a large reduction ratio position, thereby enhancing decelerability over the entire range of the reduction ratio.

To attain the above object, the present invention provides an auxiliary air amount control system for an internal combustion engine having an output shaft, a transmission connected to the output shaft, an intake passage, and a throttle valve arranged in the intake passage, the system including an auxiliary air passage bypassing the throttle valve, a control valve for controlling an amount of auxiliary air supplied to the engine through the auxiliary air passage by varying an opening of the auxiliary air passage, valve opening-setting means responsive to an opening of the throttle valve for setting an opening of the control valve, and valve opening-progressively decreasing means for progressively decreasing the opening of the control valve from a value thereof set by the valve opening-setting means as an initial value when the engine is in a predetermined decelerating condition.

As a first aspect of the invention, the auxiliary air amount control system is characterized by an improvement comprising:

reduction ratio-detecting means for detecting a reduction ratio assumed by the transmission; and valve opening-varying means for varying the opening of the control valve set by the valve opening-setting means to a larger value as the reduction ratio detected by the reduction ratio-detecting means is larger, to thereby increase the opening of the control valve.

As a second aspect of the invention, the auxiliary air amount control system comprises minimum opening-varying means for varying the minimum value of the opening of the throttle valve at which the valve opening-setting means can set the opening of the valve control to a value larger than zero, to a smaller value as the reduction ratio detected by the reduction ratio-detecting means is larger.

As a third aspect of the invention, the auxiliary air amount control system comprises progressive decrease rate-varying means for varying a rate at which the opening of the control valve is progressive decreased, to a smaller value as the reduction ratio detected by the reduction ratio-detecting means is larger.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
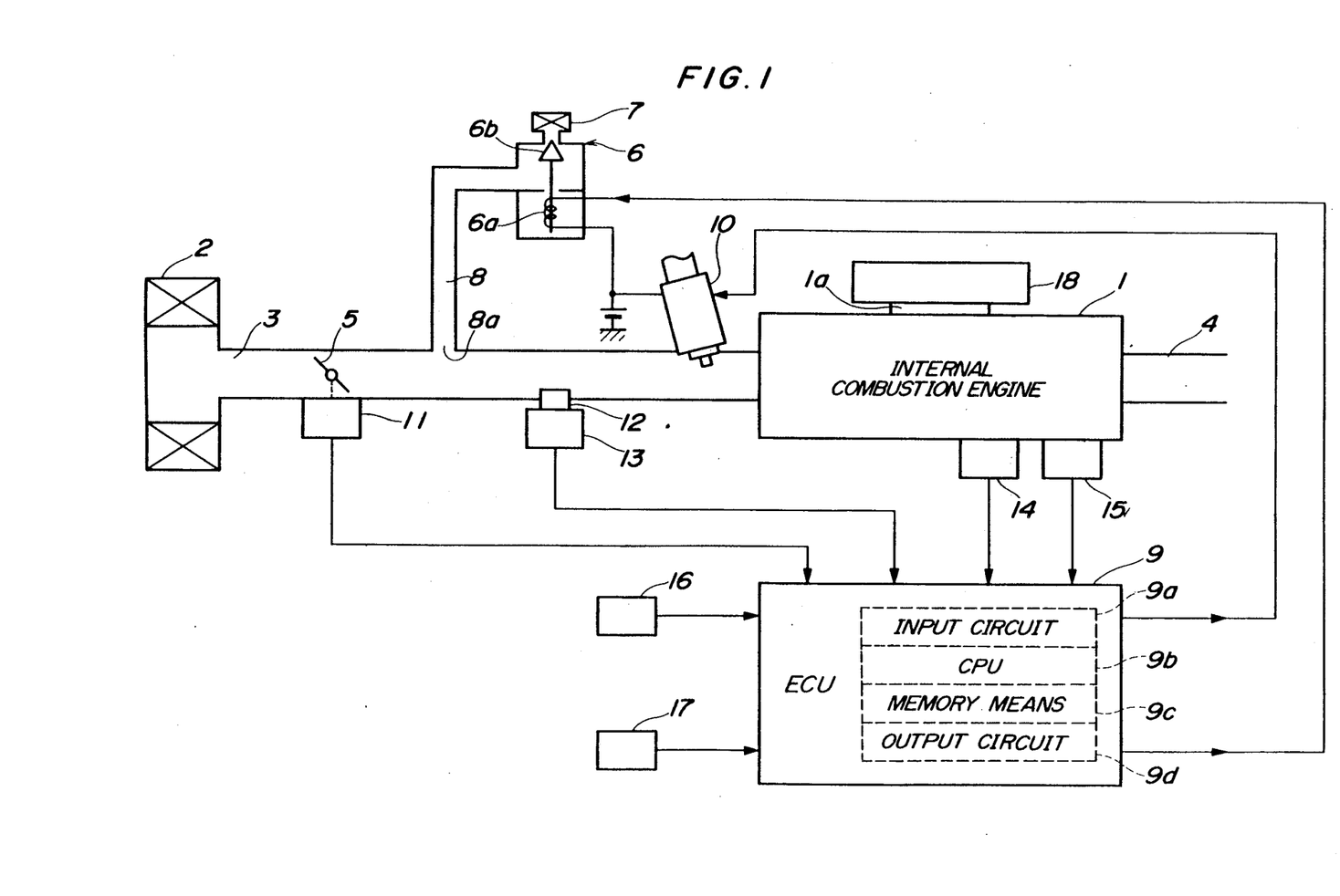
FIG. 1 is a block diagram illustrating the whole arrangement of a fuel control system incorporating an auxiliary air amount control system according to the invention.

Referring first to FIG. 1, there is schematically illustrated the entire arrangement of a fuel supply control system for an internal combustion engine incorporating an auxiliary air amount control system. In FIG. 1, reference numeral 1 designates an internal combustion engine which may be a four-cylinder type, and to which are connected an intake pipe 3 with an air cleaner 2 mounted at its open end, and an exhaust pipe 4, at an intake side and an exhaust side of the engine 1, respectively. A throttle valve 5 is arranged within the intake pipe 3, and an auxiliary passage 8 opens at its open end 8a into the intake pipe 3 at a location downstream of the throttle valve 5, and communicates with the atmosphere at its end mounted with an air cleaner 7. Arranged across the auxiliary air passage 8 is a control valve 6 for controlling the amount of auxiliary air to be supplied to the engine 1 through the auxiliary air passage 8. The control valve 6 is a normally-closed type which comprises a linear solenoid 6a, and a valve body 6b which opens the auxiliary air passage 8 during energization of the solenoid 6a. The solenoid 6a is electrically connected to an electronic control unit (hereinafter called "the ECU") 9, which controls the amount I of current to be supplied to the solenoid 6a to thereby control the opening degree of the control valve 6.

Fuel injection valves 10, only one of which is shown, are arranged in a manner projected into the interior of the intake pipe 3 at a location between the engine 1 and the open end 8a of the auxiliary air passage 8, which are connected to a fuel pump, not shown, and also electrically connected to the ECU 9.

A throttle valve opening ($\theta_{TH}$) sensor 11 is connected to the throttle valve 5, an intake pipe absolute pressure (PBA) 13 is provided in communication through a conduit 12 with the interior of the intake pipe 3 at a location downstream of the open end 8a of the auxiliary air passage 8, and an engine coolant temperature (TW) sensor 14 and an engine rotational speed (Ne) sensor 15 are mounted in the cylinder block of the engine 1. The sensors are electrically connected to the ECU 9, respectively.

The Ne sensor 15 generates one pulse at a particular crank angle position of each of the engine cylinders, which is in advance of the top-dead-center position (TDC) of a piston in the cylinder immediately before its suction stroke by a predetermined crank angle, whenever the engine crandshaft rotates through 180 degrees, i.e., each pulse of the top-dead-center position (TDC) signal. Pulses of the TDC signal generated by the Ne sensor 15 are supplied to the ECU 9.

A transmission 18 is connected to the crankshaft (outputshaft) 1a of the engine 1.

Further electrically connected to the ECU 9 are a vehicle speed (V) sensor 16 for detecting vehicle speed, and a switch 17 for detecting the kind of a transmission connected to the engine 1, e.g. an automatic transmission or a manual transmission, and outputs from the sensors 15 and 16 are supplied to the ECU 9.

The ECU 9 comprises an input circuit 9a having functions of shaping waveforms of pulses of input signals from various sensors, shifting voltage levels of input signals from sensors, and converting analog values of the input signals into digital signals, etc., a central processing unit (hereinafter called "the CPU") 9b, memory means 9c storing various operational programs to be executed within the CPU 9b as well as for storing various calculated data from the CPU 9b, and an output circuit 9d for supplying driving signals to the fuel injection valves 10 and the control valve 6.

In the present embodiment, the ECU 9 forms valve opening-setting means, valve opening-progressively decreasing means, reduction ratio-detecting means, valve opening-varying means, minimum opening-varying means, and progressive decrease rate-varying means.

The CPU 9b operates in synchronism with generation of TDC signal pulses to determine operating conditions of the engine 1 in response to engine parameter signals supplied from various sensors, and calculate a current amount I to be supplied to the linear solenoid 6a of the control valve 6 (hereinafter merely called "the current amount I") on the basis of the determined engine operating conditions. A value $I_{DP}$ of the current amount I to be supplied during a predetermined engine decelerating condition etc. is calculated in accordance with a subroutine in FIG. 2, hereinafter referred to.

The CPU 9b also calculates a fuel injection period $T_{OUT}$ for which the fuel injection valves 10 should be opened, in accordance with the determined engine operating conditions and in synchronism with generation of TDC signal pulses, by the use of the following equation (1):

$$T_{OUT}=Ti \times K_1 + K_2 \tag{1}$$

where Ti represents a basic value of the valve opening period for the fuel injection valves 10, which is determined e.g. as a function of the intake pipe absolute pressure (PBA) and the engine rotational speed Ne. $K_1$ and $K_2$ represent correction coefficients and correction variables, respectively, which are calculated on the basis of engine operating parameter signals from various sensors to such values as to optimize various operating characteristics of the engine such as fuel consumption and accelerability.

The CPU 9b supplies the control valve 6 and the fuel injection valves 10 via the output circuit 9d with respective driving signals based on the fuel injection period $T_{OUT}$ and the current amount I calculated as above.

Figures 2, 2C:
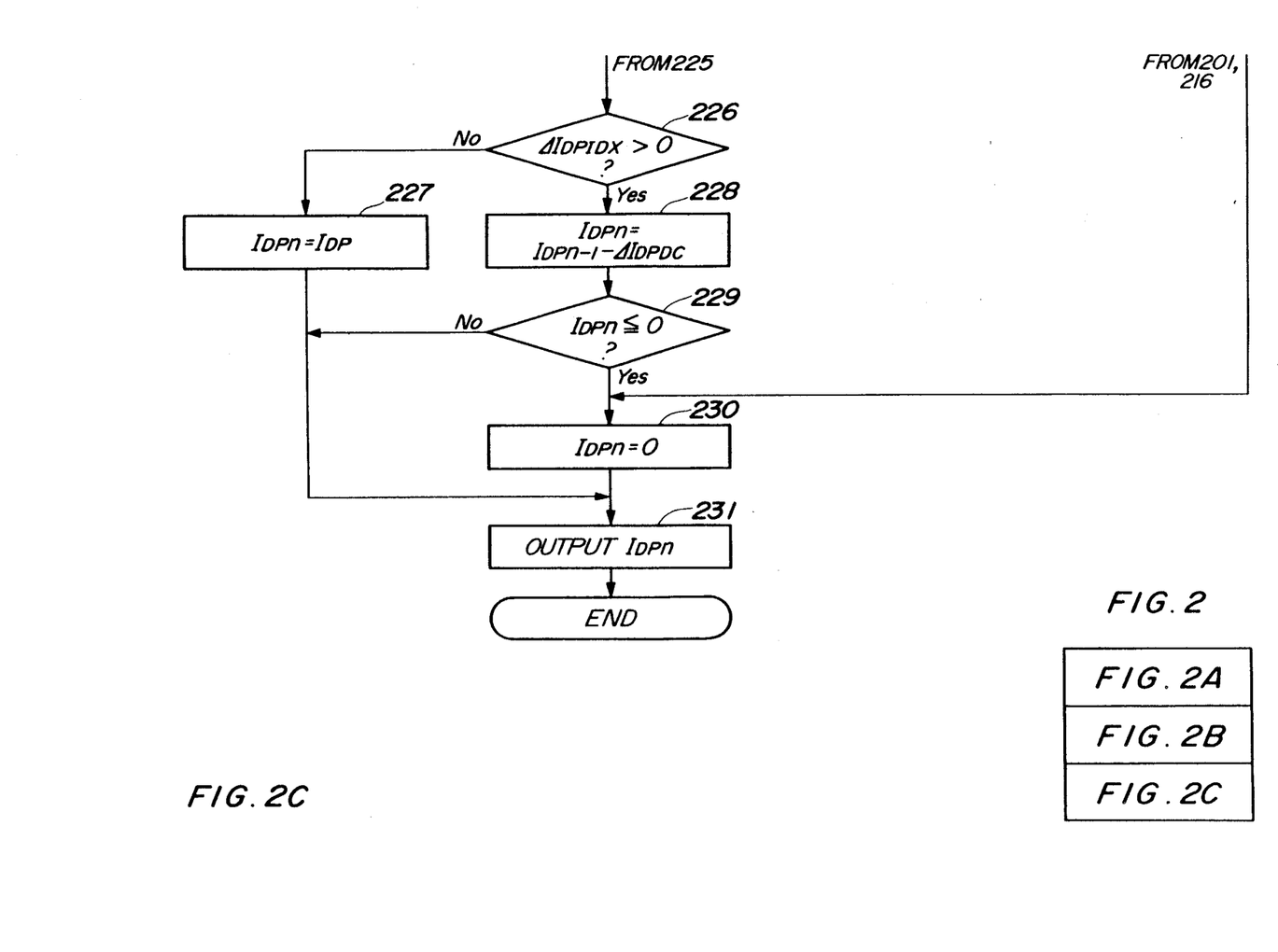
FIG. 2 is a flowchart of a subroutine for calculating a current amount $I_{DP}$ supplied to a control valve appearing in FIG. 1.
Figure 2A:
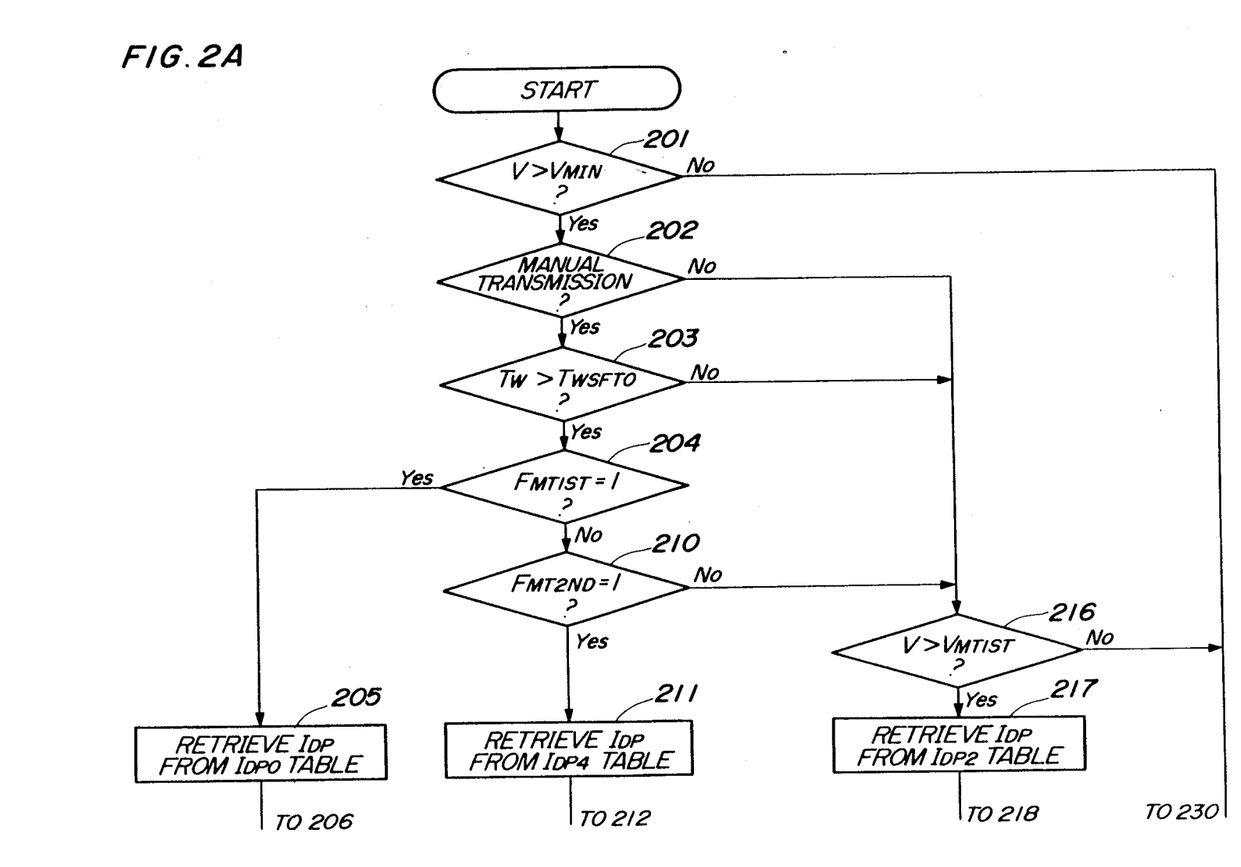
Figure 2B:
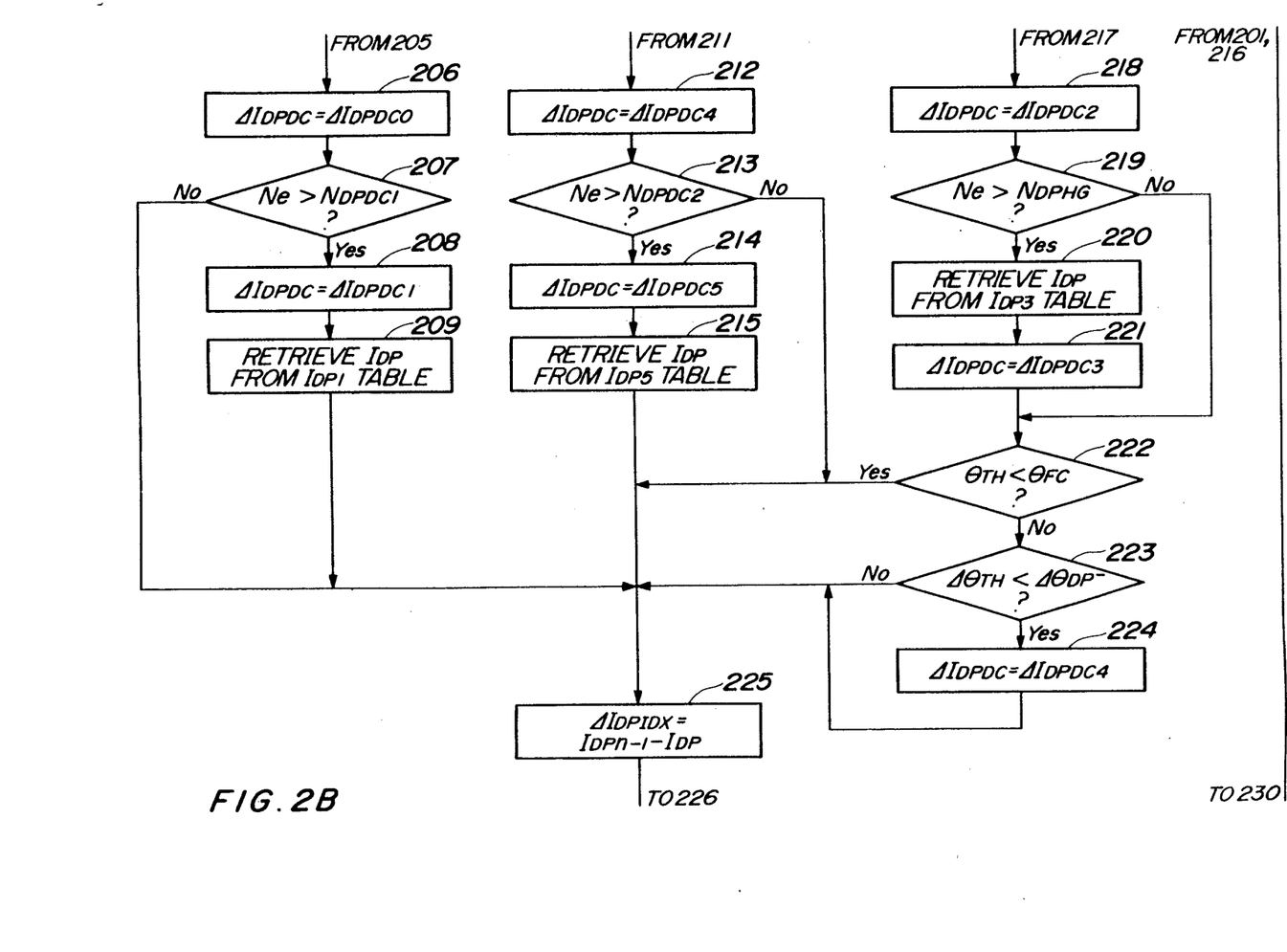

FIG. 2 is a flowchart of the subroutine for calculating the current amount $I_{DP}$. This program is executed in synchronism with TDC signal pulses.

First, at a step 201 it is determined whether or not the vehicle speed V is higher than a first predetermined value $V_{MIN}$, e.g. 4 km/h, which is the minimum value that permits the vehicle to run. If the answer is No, the program proceeds to a step 230, hereinafter referred to, while if the answer is Yes, it is determined at a step 202 whether or not the vehicle is equipped with a manual transmission, and at a step 203 whether or not the engine coolant temperature $T_W$ is higher than a predetermined value $T_{WSFT0}$, e.g. 60° C., which is a threshold value below which fast-idling operation is carried out.

If the answers at the steps 202 and 203 are both Yes, it is determined at a step 204 whether or not a first flag $F_{MT1ST}$ has been set to a value of 1. The first flag $F_{MT1ST}$ is set to 1 when it is determined, in accordance with a subroutine, not shown, on the basis of the relationship between the engine rotational speed Ne and the vehicle speed V that the transmission is in a first speed gear position. If the answer at the step 204 is Yes, that is, if the gear position is the first speed gear position, the current amount $I_{DP}$ is retrieved from an $I_{DP0}$ table for the first speed gear position at a step 205.

Figure 3:
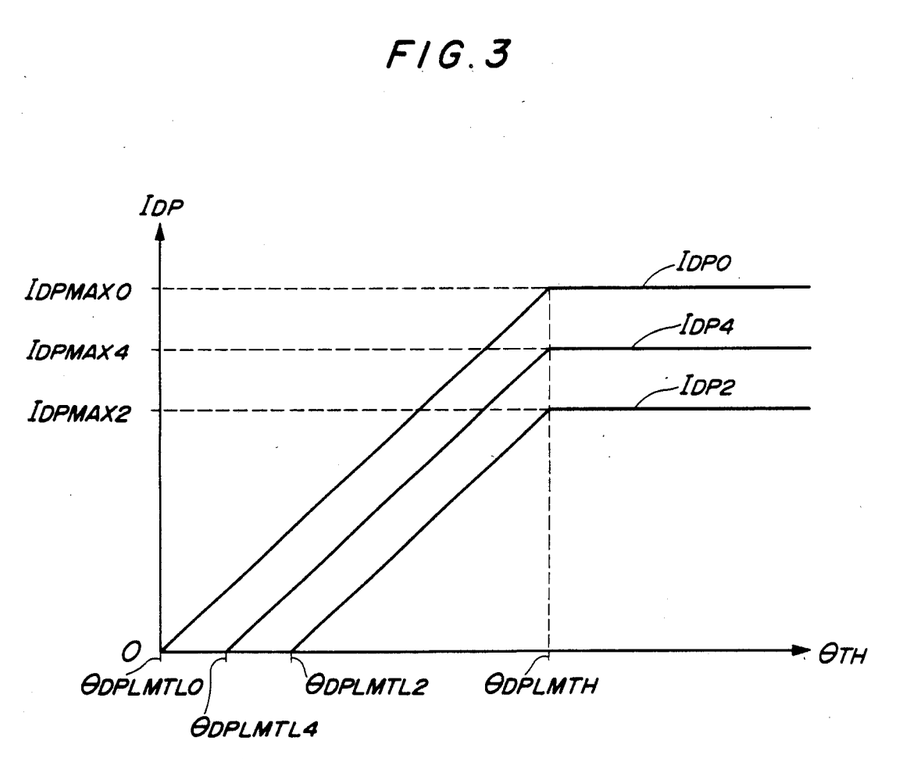
FIG. 3 is a graph showing tables for obtaining the current amount $I_{DP}$ in response to the throttle valve opening $\theta_{TH}$, which are applied to the subroutine in FIG. 2.

FIG. 3 shows the $I_{DP0}$ table for the first speed gear position, as well as an $I_{DP4}$ table for a second speed gear position, and an $I_{DP2}$ table for a high speed gear position, both hereinafter referred to. As will be understood from FIG. 3, the current amounts $I_{DP0}$, $I_{DP4}$, and $I_{DP2}$ are set such that they are set to a value of 0 when the throttle valve opening $\theta_{TH}$ is smaller than respective lower limit values $\theta_{DPLMTL0}$, $\theta_{DPLMTL4}$ and $\theta_{DPLMTL2}$ ($\theta_{DPLMTL0} < \theta_{DPLMTL4} < \theta_{DPLMTL2}$), increase linearly as the throttle valve opening $\theta_{TH}$ increases between the respective lower limit values $\theta_{DPLMTL0}$, $\theta_{DPLMTL4}$ and $\theta_{DPLMTL2}$ and a common upper limit value $\theta_{DPLMTH}$, and are set at respective constant values $I_{DPMAX0}$, $I_{DPMAX4}$, and $I_{DPMAX2}$ ($I_{DPMAX0} > I_{DPMAX4} > I_{DPMAX2}$) when the throttle valve opening $\theta_{TH}$ is larger than the common upper limit value $\theta_{DPLMTH}$.

As described later, the current amount $I_{DP}$ obtained from the tables in FIG. 3 is directly supplied to the control valve 6 as $I_{DPn}$ when the engine 1 is not in the predetermined decelerating condition, while it is set as an initial value and then gradually decreased when the engine 1 is in the predetermined decelerating condition.

As will be understood from the tables in FIG. 3, as the transmission is in a lower speed gear position, i.e., the reduction ratio is larger, the current amount $I_{DP}$ is set to a larger value, so that the auxiliary air amount to be supplied to the engine 1 through the control valve 6, which is gradually decreased during the predetermined decelerating condition of the engine 1, is controlled such that the ratio of the auxiliary air amount to the total intake air amount, i.e., the sum of the air amount introduced through the throttle valve 5 and the auxiliary air amount is larger as the reduction ratio is larger. Therefore, when the transmission is in such a low speed gear position as the first or second speed gear position, the auxiliary air amount is progressively decreased from a state in which the ratio of the auxiliary air amount to the total intake air amount is large during deceleration of the engine, to thereby enable to reduce engine shock at the start of deceleration, while when the transmission is in a higher speed gear position, the ratio of the auxiliary air amount is small to thereby enable to enhance decelerability of the engine 1.

Further, as described above, the lower limit value $\theta_{DPLMTL}$ is set to a smaller value as the reduction ratio is larger, so that the minimum value of throttle valve opening at which the current amount $I_{PD}$ can be supplied becomes smaller. In other words, when the transmission is in a lower speed gear position, the control valve 6 is open even if the throttle valve opening $\theta_{TH}$ is rather small, and then the opening of the control valve 6 is progressively decreased in accordance with closing of the throttle valve 5, whereby engine shock can be reduced which is caused when the engine is in such a decelerating condition as in the case that the driver releases the accelerator pedal after having slightly stepped it on.

At a step 206 following the step 205, a subtraction value $\Delta I_{DPDC}$ which is applied at a step 225, hereinafter referred to, for gradually decreasing the value of the current amount $I_{DP}$ is set to a predetermined value $\Delta I_{DPDC0}$ for the first speed gear position. The predetermined value $\Delta I_{DPDC0}$ for the first speed gear position, as well as a predetermined value $\Delta I_{DPDC4}$ for the second speed gear position, and a predetermined value $\Delta I_{DPDC2}$ for the high speed gear position, both hereinafter referred to, are set to respective values which fulfill $\Delta I_{DPDC0} < \Delta I_{DPDC4} < \Delta I_{DPDC2}$. Thus, the subtraction value $\Delta I_{DPDC}$ is set to a smaller value as the reduction ratio is larger, so that the intake air amount can be gently decreased by gently decreasing the opening of the control valve 6, during deceleration with the transmission being in a lower speed position, to thereby reduce the engine shock, while the intake air amount is abruptly decreased during deceleration with the transmission being in a high speed gear position, to thereby enhance decelerability.

At the next step 207 it is determined whether or not the engine rotational speed Ne is higher than a predetermined value $N_{DPDC1}$, e.g. 2000 rpm, for the first speed gear position. If the answer is Yes, the subtraction value $\Delta I_{DPDC}$ is reset at a step 208 to a predetermined value $\Delta I_{DPDC1}$ for a higher engine rotational speed range which is smaller than the predetermined value $\Delta I_{DPDC0}$ for the first speed gear position, followed by the program proceeding to a step 209 where the current amount $I_{DP}$ is retrieved from an $I_{DP1}$ table, not shown, for the higher engine rotational speed range in which the current amount $I_{DP}$ is set to a larger value than that in the $I_{DP0}$ table for the first speed gear position. If the answer at the step 207 is No, the program proceeds to the step 225.

If the answer at the step 204 is No, that is, if the transmission is not in the first speed gear position, it is determined at a step 210 whether or not a second flag $F_{MT2ND}$ is equal to a value of 1. The second flag $F_{MT2ND}$ is set to 1 when it is determined in a similar manner to that used for the first flag $F_{MT1ST}$ that the transmission is in the second speed gear position. If the answer at the step 210 is Yes, that is, if the transmission is in the second speed gear position, the value of the current amount $I_{DP}$ is retrieved and the subtraction value $\Delta I_{DPDC}$ is set, similarly at the steps 205 and 209. More specifically, at a step 211 the current amount $I_{DP}$ is retrieved from the $I_{DP4}$ table for the second speed gear position in FIG. 3, and at a step 212 the subtraction value $\Delta I_{DPDC}$ is set to the predetermined value $\Delta I_{DPD4}$ for the second speed gear position. Then, it is determined at a step 213 whether or not the engine rotational speed Ne is higher than a predetermined value $N_{DPDC2}$ for the second speed gear position, e.g. 1500 rpm. If $Ne > N_{DPDC2}$, the subtraction value $\Delta I_{DPDC}$ is reset at a step 214 to a predetermined value $\Delta I_{DPDC5}$ ($< \Delta I_{DPDC4}$) for a higher engine rotational speed range, and the current amount $I_{DP}$ is retrieved at a step 215 from an $I_{DP5}$ ($> I_{DP4}$) table for the higher engine rotational speed range, not shown, followed by the program proceeding to the step 225.

If the answer at the step 210 is No, that is, if the transmission is not in the first or second speed gear position, it is determined at a step 216 whether or not the vehicle speed V is higher than a second predetermined speed $V_{MT1ST}$, e.g. 20 km/h. If the answer is No, the program proceeds to a step 230, whereas if the answer is Yes, the current amount $I_{DP}$ is retrieved and the subtraction value $\Delta I_{DPDC}$ is set in a similar manner to that used in the first or second gear position.

More specifically, at a step 217 the current amount $I_{DP}$ is retrieved from the $I_{DP2}$ table for the high speed gear position in FIG. 3, the subtraction value $\Delta I_{DPDC}$ is set to the predetermined value $\Delta I_{DPDC2}$ for the high speed gear position at a step 218, and it is determined at a step 219 whether or not the engine rotational speed Ne is higher than a predetermined value $N_{DPHG}$ for the high speed gear position, e.g. 1500 rpm. If $Ne > N_{DPHG}$, the current amount $I_{DP}$ is retrieved at a step 220 from an $I_{DP3}$ ($> I_{DP2}$) table for a higher engine rotational speed range, not shown, and the subtraction value $\Delta I_{DPDC}$ is reset at a step 221 to a predetermined value $\Delta I_{DPDC3}$ ($< \Delta I_{DPDC2}$) for the higher engine rotational speed range, followed by the program proceeding to a step 222, hereinafter referred to.

If the answer at the step 202 or 203 is No, the program proceeds to steps 216 et seq. That is, if the vehicle is equipped with an automatic transmission, or if the engine is in fast-idling, the current amount $I_{DP}$ and the subtraction value $\Delta I_{DPDC}$ are set to respective values for the high speed gear position, irrespective of the actual gear position. This is because in a vehicle equipped with an automatic transmission a torque convertor of the transmission acts as an engine shock absorber, while during fast-idling of the engine auxiliary air is additionally supplied, and therefore engine shock due to deceleration can be reduced.

At the step 222 it is determined whether or not the throttle valve opening $\theta_{TH}$ is smaller than a predetermined value $\theta_{FC}$ indicating that the throttle valve 5 is substantially fully closed. If the answer is No, it is determined at a step 223 whether or not the difference $\Delta\theta_{TH}$ $(=\theta_{THn}-\theta_{THn-1})$ between a value $\theta_{THn}$ of the throttle valve opening $\theta_{TH}$ in the present loop and a value $\theta_{THn-1}$ of the throttle valve opening $\theta_{TH}$ in the last loop is smaller than a predetermined value $\Delta\theta_{DP}-$ which is a negative value. If the answer at the step 223 is Yes, that is, if $\theta_{TH} \geq \theta_{FC}$ and $\Delta\theta_{TH} < \Delta\theta_{DP}-$ hold, it is judged that the throttle valve 5 has been abruptly closed so that engine shock is likely to occur. Therefore, the subtraction value $\Delta I_{DPDC}$ is reset at a step 224 to the predetermined value $\Delta I_{DPDC4}$ for the second speed gear position, followed by the program proceeding to the step 225. If the answer at the step 222 is Yes, or if the answer at the step 223 is No, the program skips over the step 204 to the step 225.

At the step 225 calculated is the difference $\Delta I_{DPIDX}$ $(=I_{DPn-1}-I_{DP})$ between the value $I_{DPn-1}$ of the current amount $I_{DP}$ obtained in the last loop and a value of the current amount $I_{DP}$ obtained in the present loop from a table used at the step 205, 209, 211, 215, 217, or 220, followed by the program proceeding to a step 226 where it is determined whether or not the difference $\Delta I_{DPIDX}$ is larger than a value of 0. If the answer at the step 226 is No, that is, if $I_{DPn-1} \leq I_{DP}$, it is judged that the throttle valve 5 is being opened or in a stationary state in which the engine 1 is not in the predetermined decelerating condition, the value $I_{DPn}$ of the current amount $I_{DP}$ in the present loop is set, at a step 227, to the value obtained in the present loop from one of the tables, followed by the program proceeding to a step 231, hereinafter referred to.

On the other hand, if the answer at the step 226 is Yes, that is, if $I_{DPn-1} > I_{DP}$, it is judged that the engine 1 is in the predetermined decelerating condition, and then the value $I_{DPn}$ in the present loop is obtained at a step 228 by subtracting the subtraction value $\Delta I_{DPDC}$ set at the step 206, 208, 212, 214, 218, 221, or 224 from the value $I_{DPn-1}$ in the last loop. Thus, the step 228 is repeatedly executed during deceleration of the engine 1, thereby gradually decreasing the value $I_{DPn}$ of the current amount $I_{DP}$, i.e., the opening of the control valve 6 and hence the auxiliary air amount.

Then, it is determined at a step 229 whether or not the value $I_{DPn}$ is smaller than a value of 0. If the answer is Yes, the value $I_{DPn}$ is reset to the value of 0 at a step 230, and the program proceeds to the step 231 where the value $I_{DPn}$ set at the step 227, 228, or 230 is supplied to the control valve 6, followed by termination of the program.

Although in the embodiment described above the control system according to the invention is applied to an ordinary type transmission in which the reduction ratio is changed in a stepwise manner, the invention is not limited to this, but may be applied to an infinitely variable transmission in which the reduction ratio is changed in a stepless manner.

If the invention is applied to this type transmission, the current amount $I_{DP}$ may be determined by providing threshold values thereof for respective different values of the reduction ratio, and selecting a table from a group of $I_{DP}$ tables similar to the tables in FIG. 3 by comparing between the actual reduction ratio with the threshold values. Alternatively, the current amount $I_{DP}$ may be determined as continuous values in accordance with the actual reduction ratio by the use of an equation which is to calculate the current amount $I_{DP}$ as a function of the reduction ratio and the throttle valve opening $\theta_{TH}$.

Further, tables for obtaining the current amount $I_{DP}$ are not limited to those in FIG. 3, but may be in various other forms.

What is claimed is:

1. An auxiliary air amount control system for an internal combustion engine having an output shaft, a transmission connected to said output shaft, an intake passage, and a throttle valve arranged in said intake passage, said system including an auxiliary air passage bypassing said throttle valve, a control valve for controlling an amount of auxiliary air supplied to said engine through said auxiliary air passage by varying an opening of said auxiliary air passage, valve opening-setting means responsive to an opening of said throttle valve for setting an opening of said control valve, and valve opening-progressively decreasing means for progressively decreasing the opening of said control valve from a value thereof set by said valve opening-setting means as an initial value when said engine is in a predetermined decelerating condition, the improvement comprising:
reduction ratio-detecting means for detecting a reduction ratio assumed by said transmission; and
valve opening-varying means for varying the opening of said control valve set by said valve opening-setting means to a larger value as the reduction ratio detected by said reduction ratio-detecting means is larger, to thereby increase the opening of said control valve.

2. A control system as claimed in claim 1, wherein insofar as the reduction ratio assumed by said transmission is constant, when the rotational speed of said engine is higher than a predetermined value said valve opening-varying means varies the opening of said control valve set by said valve opening-setting means to a value larger than a value set when the rotational speed of said engine is below said predetermined value.

3. A control system as claimed in claim 1, wherein said varying of the opening of said control valve to a larger value by said valve opening-varying means, is effected when said transmission is shifted between lower speed gear positions.

4. A control system as claimed in any of claims 1-3, wherein said transmission is a manual transmission.

5. A control system as claimed in claim 1, wherein said transmission is an automatic transmission which can assume lower speed gear positions and a higher speed gear position, the opening of said control valve set by said valve opening-setting means being varied to a value corresponding to said higher speed gear position which is smaller than values corresponding to said lower speed gear positions, irrespective of the reduction ratio assumed by said transmission.

6. A control system as claimed in claim 1, wherein said transmission can assume lower speed gear positions and a higher speed gear position, and when said engine is in a fast-idling condition the opening of said control valve set by said valve opening-setting means is varied to a value corresponding to said higher speed gear position which is smaller than values corresponding to said lower speed gear positions, irrespective of the reduction ratio assumed by said transmission.

7. An auxiliary air amount control system for an internal combustion engine having an output shaft, a transmission connected to said output shaft, an intake passage, and a throttle valve arranged in said intake passage, said system including an auxiliary air passage bypassing said throttle valve, a control valve for controlling an amount of auxiliary air supplied to said engine through said auxiliary air passage by varying an opening of said auxiliary air passage, valve opening-setting means responsive to an opening of said throttle valve for setting an opening of said control valve, and valve opening-progressively decreasing means for progressively decreasing the opening of said control valve from a value thereof set by said valve opening-setting means as an initial value when said engine is in a predetermined decelerating condition, the improvement comprising:
reduction ratio-detecting means for detecting a reduction ratio assumed by said transmission, and
throttle valve minimum opening-varying means for varying the minimum value of the opening of said throttle valve at which said valve opening-setting means can set the opening of said control valve to a value larger than zero, to a smaller value as the reduction ratio detected by said reduction ratio-detecting means is larger.

8. A control system as claimed in claim 7, wherein said varying of the minimum value of the opening of said throttle valve to a smaller value by said throttle valve reduction ratio-detecting means, is effected when said transmission is shifted between lower speed gear position.

9. A control system as claimed in claims 7 or 8, wherein said transmission is a manual transmission.

10. A control system as claimed in claim 7, wherein said transmission is an automatic transmission which can assume lower speed gear positions and a higher speed gear position, the minimum value of the opening of said throttle valve being varied to a value corresponding to said higher speed gear position which is larger than values corresponding to said lower speed gear positions, irrespective of the reduction ratio assumed by said transmission.

11. A control system as claimed in claim 7, wherein said transmission can assume lower speed gear positions and a higher speed gear position, and when said engine is in a fast-idling condition the minimum value of the opening of said throttle valve is varied to a value corresponding to said higher speed gear position which is larger than values corresponding to said lower speed gear positions, irrespective of the reduction ratio assumed by said transmission.

12. An auxiliary air amount control system for an internal combustion engine having an output shaft, a transmission connected to said output shaft, an intake passage, and a throttle valve arranged in said intake passage, said system including an auxiliary air passage bypassing said throttle valve, a control valve for controlling an amount of auxiliary air supplied to said engine through said auxiliary air passage by varying an opening of said auxiliary air passage, valve opening-setting means responsive to an opening of said throttle valve for setting an opening of said control valve, and valve opening-progressively decreasing means for progressively decreasing the opening of said control valve from a value thereof set by said valve opening-setting means as an initial value when said engine is in a predetermined decelerating condition, the improvement comprising:
reduction ratio-detecting means for detecting a reduction ratio assumed by said transmission, and
progressive decrease rate-varying means for varying a rate at which the opening of said control valve is progressive decreased, to a smaller value as the reduction ratio detected by said reduction ratio-detecting means is larger.

13. A control system as claimed in claim 12, wherein insofar as the reduction ratio assumed by said transmission is constant, when the rotational speed of said engine is higher than a predetermined value said progressive decrease rate-varying means varies the rate of progressive decrease of the opening of said control valve to a value smaller than a value set when the rotational speed of said engine is below said predetermined value.

14. A control system as claimed in claim 12, wherein said varying of the rate of progressive decrease of the opening of said control value to a smaller value by said progressive decrease rate-varying means, is effected when said transmission is shifted between lower speed gear positions.

15. A control system as claimed in any one of claims 12-14, wherein said transmission is a manual transmission.

16. A control system as claimed in claim 12, wherein said transmission is an automatic transmission which can assume lower speed gear positions and a higher speed gear position, the rate of progressive decrease of the opening of said control valve being varied to a value corresponding to said higher speed gear position which is larger than values corresponding to said lower speed gear positions, irrespective of the reduction ratio assumed by said transmission.

17. A control system as claimed in claim 12, wherein said transmission can assume lower speed gear positions and a higher speed gear position, and when said engine is in a fast-idling condition the rate of progressive decrease of the opening of said control valve is varied to a value corresponding to said higher speed gear position which is larger than values corresponding to said lower speed gear positions, irrespective of the reduction ratio assumed by said transmission.

18. A control system as claimed in claim 12, wherein when said transmission is in a higher speed gear position, the rate at which the opening of said control valve is progressively decreased is varied to said smaller value if the opening of said throttle valve is larger than a predetermined value indicating that said throttle valve is substantially fully closed and at the same time a change rate of the opening of said throttle valve is lower than a negative predetermined value.

19. An auxiliary air amount control system for an internal combustion engine having an output shaft, a transmission connected to said output shaft, an intake passage, and a throttle valve arranged in said intake passage, said system including an auxiliary air passage bypassing said throttle valve, a control valve for controlling an amount of auxiliary air supplied to said engine through said auxiliary air passage by varying an opening of said auxiliary air passage, valve opening-setting means responsive to an opening of said throttle valve for setting an opening of said control valve, and valve opening-progressively decreasing means for progressively decreasing the opening of said control valve from a value thereof set by said valve opening-setting means as an initial value when said engine is in a predetermined decelerating condition, improvement comprising:

reduction ratio-detecting means for detecting a reduction ratio assumed by said transmission;

valve opening-varying means for varying the opening of said control valve set by said valve opening-setting means to a larger value as the reduction ratio detected by said reduction ratio-detecting means is larger, to thereby increase the opening of said control valve;

throttle valve minimum opening-varying means for varying the minimum value of the opening of said throttle valve at which said valve opening-setting means can set the opening of said control valve to a value larger than zero, to a smaller value as the reduction ratio detected by said reduction ratio-detecting means is larger; and progressive decrease rate-varying means for varying a rate at which the opening of said control valve is progressive decreased, to a smaller value as the reduction ratio detected by said reduction ratio-detecting means is larger.

* * * * *